United States Patent [19]

Gray

[11] 4,204,637
[45] May 27, 1980

[54] TICKET AND READING DEVICE

[76] Inventor: Alan M. Gray, 32 Johnston Crescent La., Cove, N.S.W., Australia

[21] Appl. No.: 889,595

[22] Filed: Mar. 23, 1978

[30] Foreign Application Priority Data

Apr. 1, 1977 [AU] Australia .................. PC9635

[51] Int. Cl.$^2$ .................. G06K 5/00; G06K 7/14; G06K 19/06
[52] U.S. Cl. .................. 235/431; 235/434; 235/462; 235/466; 235/494
[58] Field of Search .............. 235/487, 434, 454, 431, 235/494; 250/555, 566, 569

[56] References Cited

U.S. PATENT DOCUMENTS

| | | | |
|---|---|---|---|
| 2,150,256 | 3/1939 | Warren | 235/454 |
| 3,211,470 | 10/1965 | Wilson | 235/487 |
| 3,695,510 | 10/1972 | Ruesch | 235/434 |
| 3,700,862 | 10/1972 | Snook et al. | 235/494 |
| 3,909,593 | 9/1975 | Olson | 346/139 R |

*Primary Examiner*—Daryl W. Cook
*Attorney, Agent, or Firm*—Beveridge, De Grandi, Kline & Lunsford

[57] ABSTRACT

A ticket reading device for reading a ticket having at least one row of indicia thereon as disclosed including means at a loading station for accepting the ticket and sensing its presence when presented for reading, means for moving the ticket from the loading station past a reading station at which the indicia is progressively translated into an electrical signal representative thereof and means at a cancellation station for identifiably marking the ticket upon successfully traversing the reading station. A ticket is also disclosed including two spaced and parallel rows of coded indicia each row being fully representative of the same predetermined information as the other but reproducing it by a different code.

4 Claims, 6 Drawing Figures

TICKET AND READING DEVICE

The present invention relates to tickets and the like and to a device for reading indicia printed thereon. Although the invention was developed primarily for use with betting tickets and will be described hereinafter with reference to this field, it will be appreciated that the invention is not limited to this particular application.

A significant problem facing the betting industry is that of ticket forgery or the possibility that a winning ticket might somehow be presented for payment twice. It is an object of the present invention to provide a card or ticket of a type which would carry a reduced risk of forgery. It is an object of a further aspect of the invention to provide a reading device for reading the improved ticket according to the invention and, in a preferred embodiment, the ticket reader incorporates means for permanently cancelling a ticket which has been successfully read.

According to one aspect of the invention there is provided a ticket reading device for reading a ticket having at least one row of indicia thereon, the device comprising:

means at a loading station for accepting the ticket and sensing its presence when presented for reading;

means for moving the ticket from the loading station past a reading station at which the indicia are progressively translated by reading means into an electrical signal representative thereof; and means at a cancellation station for identifiably marking the ticket upon successfully traversing the reading station.

According to a further aspect of the invention there is provided a ticket including two spaced and parallel rows of coded indicia, each row being fully representative of the same predetermined information as the other but reproducing it by a different code.

Embodiments of the invention will now be described, by way of example only, with reference to the accompanying drawings in which.

Figure 5:
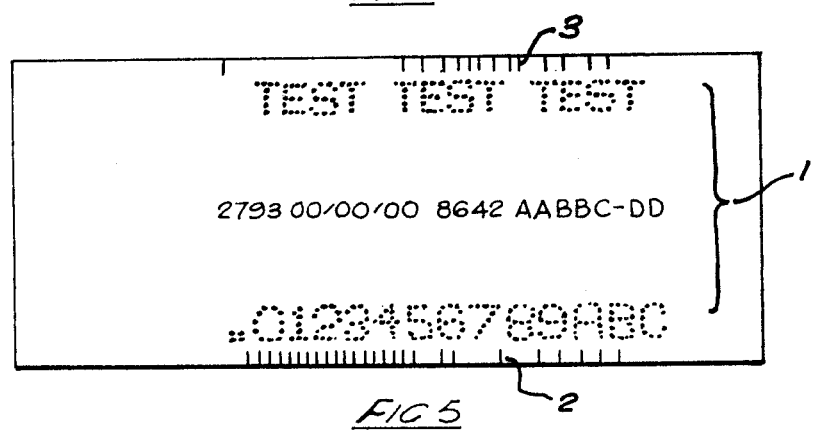
FIG. 5 shows one face of a sample betting ticket according to the invention.

Referring initially to FIG. 5 of the drawings, the illustrated ticket includes three central lines of print 1 carrying useful information in a readily identifiable form. This information may, for example, include the name of a racing club, the date and number of a particular race, the horse number or numbers, the type of wager and its value. In addition to the required amount of readily identifiable information, the ticket also contains two further groups of information which, in the illustrated embodiment, are respectively recorded by bar codes 2 and 3 extending along opposite parallel longitudinal marginal edge portions of the ticket.

The bar codes 2 and 3 on opposite marginal edges reproduce relevant ticket information and serial number which has been generated randomly and stored by a central processing unit in the case of each individual ticket at issuance. Bar code 2 carries complementary coding to bar code 3 of the information contained in bar code 3. In this way, the arrangement of the bars in bar code 2 and 3 will be unique to each ticket. It will be appreciated, therefore, that no two tickets in any preselected series will be identical and the probability of an intending forger reproducing the exact random coding of an issued but unknown ticket is so small as to be virtually negligible.

Referring now to FIGS. 1 to 4, the illustrated ticket reading device includes a base frame 4 which supports a pair of internally toothed gears 5 and 6 for rotation relative to the frame 4. The gears 5 and 6 in turn support resilient drive rings 7 and 8 which bear against pressure rollers 9 and 10, gears 5 and 6 being spaced apart by a spacer ring 11.

The gears 5 and 6 are driven by a motor unit 12 which initially drives a timing shaft 13 through gears 14 and 15. The timing shaft in turn supports a timing disc 16 and a spur gear 17 which engages a complementary reduction gear 18 mounted on a main drive shaft 19. Power is transferred from the drive shaft 19 to the internally threaded gears 5 and 6 by means of a single gear 20 which serves to interlock the motion of the gears 5 and 6.

In operation, a ticket is presented to a ticket receiving chute 21 in an inverted position such that the right hand edge of the ticket as illustrated comes into contact with the roller 10 and the resilient drive rings 7 and 8. When the ticket is correctly presented to the chute 21 it breaks a light beam generated by sensing device 22 and thereby actuates the motor 12 to draw the ticket through the reader. As this occurs, the ticket is positively located by frictional engagement between the roller 10 and drive rings 7 and 8, while its opposite longitudinal edges engage in arcuate grooves 23 and 24.

As the ticket moves through the reading device, the two bar codes traverse a reading station at which their information is read by an optical scanning device 25 which translate the information into a corresponding electrical signal for subsequent processing. Spring loaded pressure blocks 26 urge the ticket against the sensing heads of the scanning device. The reading function obtains its required timing information from the timing disc 16 which contains a number of radial slots equally spaced circumferentially around the periphery of the disc, the progress of the ticket through the reader being monitored by an optical sensor 28 which registers the successive passage of each radial timing slot. The operation of the optical sensors and scanning device is well known and will not be described further.

Figure 6:
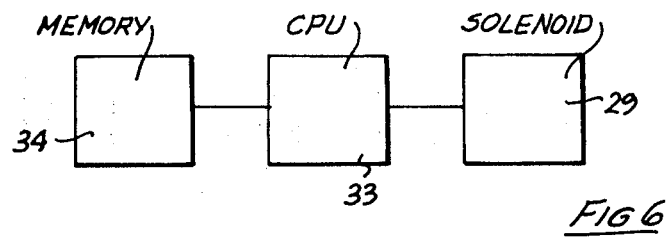
FIG. 6 is a block diagram illustrating connection of the ticket reading device to a central processing unit and memory in accordance with the present invention.
Figure 1:
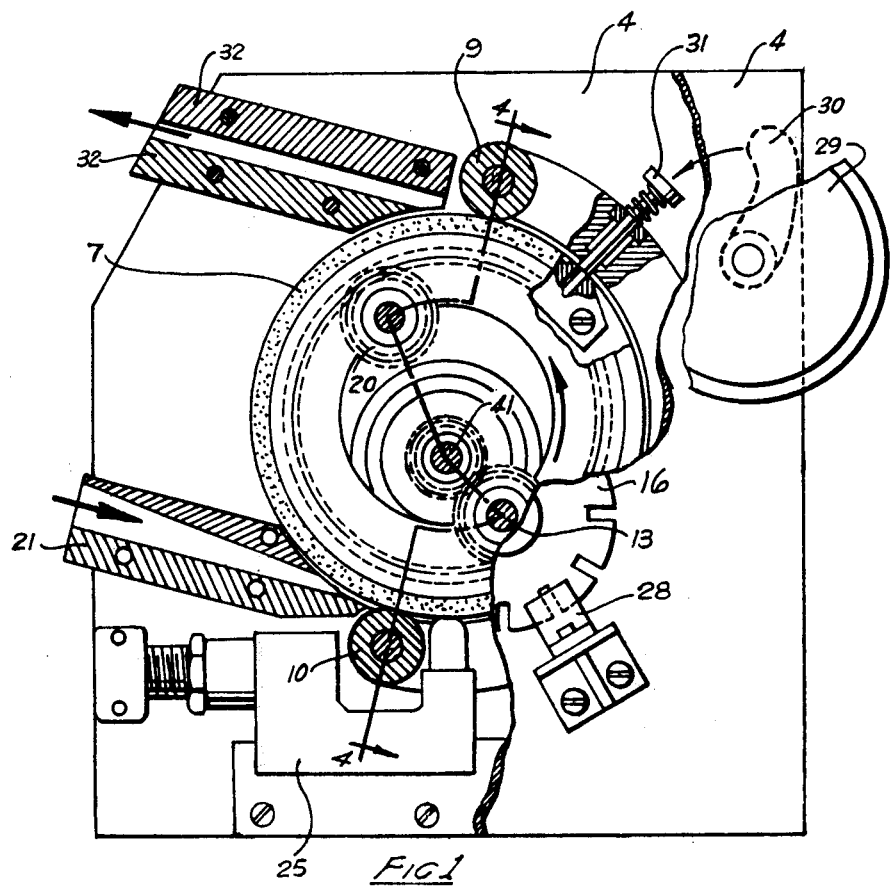
FIG. 1 is a sectional side elevation of a betting ticket reading device according to the invention.
Figure 2:
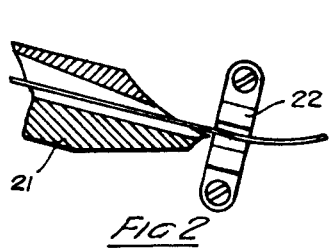
FIG. 2 is a sectional side elevation of part of the device shown in FIG. 1.
Figure 3:
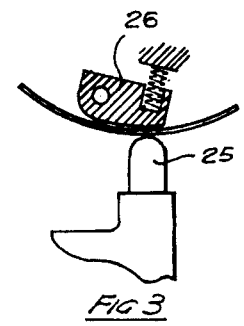
FIG. 3 is a sectional side elevation of another part of the device shown in FIG. 1.
Figure 4:
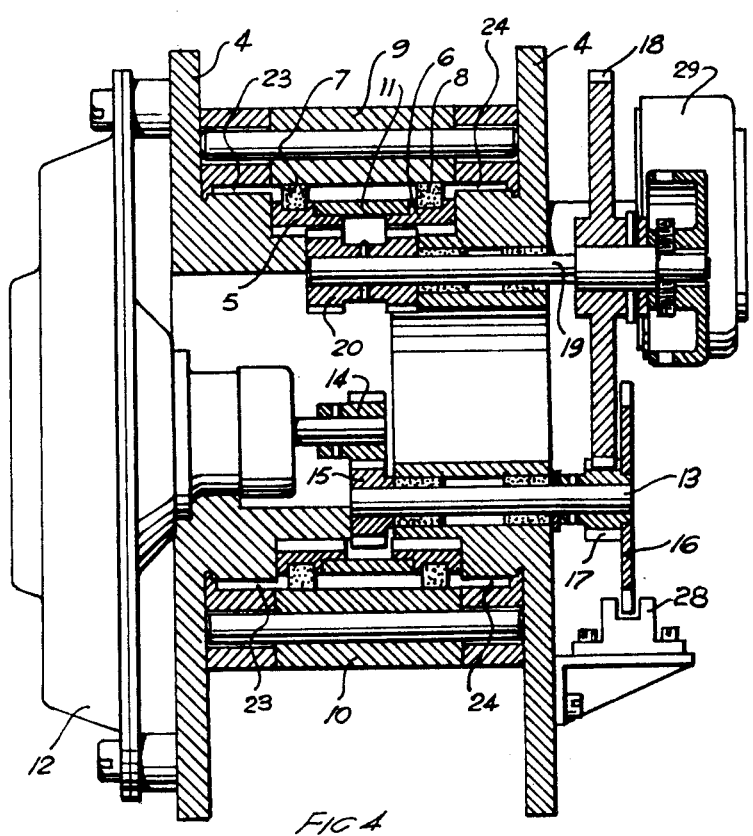
FIG. 4 is a section taken generally one line 4—4 of FIG. 1.

Once the ticket has traversed the reading station such that all recorded information has been transferred to a central processor 33, as shown in FIG. 6, the reader receives instructions from the central processor as to whether the information recorded on the ticket is correct and consistent with information stored in the central processor's memory 34 in relation to that ticket. If the ticket has been correctly read and is entitled to payment, the motor is momentarily stopped and a rotary solenoid 29 operates such that a pair of hammers 30 are caused to impact against a corresponding pair of punches 31 which perforate the ticket in its opposite marginal edge portions. The position of the perforations is arranged such that at least one bar in either bar code sequence is removed such that the ticket would not be read correctly if it were again presented to the reader. After cancellation, the motor is restarted and the ticket leaves the reader via exit chute 32.

If a ticket is incorrectly read, that is to say, the information presented to the central processor by the reader does not agree with that held in storage in relation to that particular ticket, the reader does not stop for cancellation but simply rejects the ticket through chute 32. Once a ticket has been correctly read and cancelled, all the information stored in connection with it in the pay-out register of the central processor is destroyed such that the ticket could not be successfully re-read, even if the alteration made by cancellation were to be somehow corrected.

Although the invention has been described with reference to a specific example, it will be appreciated by those skilled in the art that the invention may be embodied in many other forms without departing from the scope of the inventive concept.

I claim:

1. A ticket reading device for reading indicia on a ticket, said device comprising:

means defining a loading station for sensing the presence of a ticket when presented for reading and accepting the ticket;

a cylindrical drum having means on its outer surface to engage the ticket;

means responsive to sensing of a ticket at said loading station for rotating said drum to rotate the ticket on the surface of said drum about the axis of said drum;

means defining a reading station including first and second indicia sensors, said first indicia sensor positioned for reading a row of indicia along one longitudinal marginal edge of a first face of the ticket as the ticket is rotated on the surface of said drum and said second indicia sensor positioned for simultaneous reading of a row of indicia along the opposite longitudinal marginal edge of the first face of the ticket, said first and second indicia sensors progressively translating the indicia into electrical signals representative thereof; and means defining a cancellation station having at least one punch to remove part of the indicia on a ticket after the reading thereof at said reading station for identifiably marking the ticket upon successfully traversing said reading station.

2. A ticket reading device as claimed in claim 1 including means for comparing information provided by the electrical signals with previously stored information relating to the ticket and means for enabling said punch to mark the ticket if the stored information corresponds with the signals.

3. A ticket reading device as claimed in claim 2 including means for erasing the stored information if the stored information corresponds with the information provided by the signals.

4. A ticket reading device as claimed in claim 2 in which said means for comparing includes means responsive to a first code for deriving first information signals from the electrical signal obtained from the first indicia sensor; means responsive to a second code for deriving second information signals from the electrical signal obtained from the second indicia sensor; and means for comparing the first and second information signals.

* * * * *